(12) United States Patent
Heiman et al.

(10) Patent No.: US 9,230,563 B2
(45) Date of Patent: Jan. 5, 2016

(54) SYSTEM, DEVICE AND METHOD FOR DETECTING SPEECH

(75) Inventors: Arie Heiman, Sde Warburg (IL); Uri Yehuday, Bat Yam (IL)

(73) Assignee: BONE TONE COMMUNICATIONS (ISRAEL) LTD., Road Town (VG)

( * ) Notice: Subject to any disclaimer, the term of this patent is extended or adjusted under 35 U.S.C. 154(b) by 14 days.

(21) Appl. No.: 14/126,138

(22) PCT Filed: Jun. 14, 2012

(86) PCT No.: PCT/IL2012/000233
§ 371 (c)(1),
(2), (4) Date: Mar. 17, 2014

(87) PCT Pub. No.: WO2012/172543
PCT Pub. Date: Oct. 20, 2012

(65) Prior Publication Data
US 2014/0207444 A1   Jul. 24, 2014

Related U.S. Application Data

(60) Provisional application No. 61/497,105, filed on Jun. 15, 2011.

(51) Int. Cl.
| | |
|---|---|
| *G10L 11/06* | (2006.01) |
| *G10L 25/78* | (2013.01) |
| *G06F 3/048* | (2013.01) |
| *G10L 15/02* | (2006.01) |

(52) U.S. Cl.
CPC ............... *G10L 25/78* (2013.01); *G06F 3/048* (2013.01); *G10L 15/02* (2013.01)

(58) Field of Classification Search
CPC ............... G10L 25/78; G10L 21/0208; G10L 2025/783; G10L 19/012; G10L 21/0272
See application file for complete search history.

(56) References Cited

U.S. PATENT DOCUMENTS

| | | | |
|---|---|---|---|
| 6,615,170 B1* | 9/2003 | Liu et al. | 704/233 |
| 6,856,259 B1* | 2/2005 | Sharp | 341/5 |
| 7,251,605 B2* | 7/2007 | Belenger et al. | 704/271 |
| 7,267,652 B2* | 9/2007 | Coyle et al. | 600/538 |
| 7,457,741 B2* | 11/2008 | Nakagawa et al. | 704/200 |
| 8,068,806 B2* | 11/2011 | Taniguchi et al. | 455/350 |
| 8,094,009 B2* | 1/2012 | Allen et al. | 340/539.12 |
| 8,125,458 B2* | 2/2012 | Keam | 345/173 |
| 8,130,984 B2* | 3/2012 | Asseily et al. | 381/151 |
| 8,228,202 B2* | 7/2012 | Buchner et al. | 340/573.1 |
| 8,269,511 B2* | 9/2012 | Jordan | 324/679 |
| 8,271,262 B1* | 9/2012 | Hsu et al. | 704/3 |
| 8,294,047 B2* | 10/2012 | Westerman et al. | 178/18.03 |
| 8,384,684 B2* | 2/2013 | Westerman | 345/173 |
| 8,445,793 B2* | 5/2013 | Westerman et al. | 178/18.03 |

(Continued)

OTHER PUBLICATIONS

International Search Report for International Patent Application No. PCT/IL2012/000233 mailed Oct. 16, 2012.

(Continued)

*Primary Examiner* — Pierre-Louis Desir
*Assistant Examiner* — Fariba Sirjani
(74) *Attorney, Agent, or Firm* — Reches Patents

(57) ABSTRACT

A mobile communication system comprises a mobile communication device provided with a touch screen; and a speech activity analyzer suitable to receive from said touch screen data indicative of pressure applied to an area of said touch screen, and of changes thereto with time.

18 Claims, 3 Drawing Sheets

(56) References Cited

U.S. PATENT DOCUMENTS

| | | | |
|---|---|---|---|
| 8,531,412 B1* | 9/2013 | Martin et al. | 345/173 |
| 8,587,542 B2* | 11/2013 | Moore | 345/173 |
| 8,624,933 B2* | 1/2014 | Marr et al. | 345/684 |
| 8,689,128 B2* | 4/2014 | Chaudhri et al. | 715/772 |
| 8,698,762 B2* | 4/2014 | Wagner et al. | 345/173 |
| 8,700,392 B1* | 4/2014 | Hart et al. | 704/231 |
| 8,773,377 B2* | 7/2014 | Zhao et al. | 345/173 |
| 8,786,561 B2* | 7/2014 | Stoumbos et al. | 345/173 |
| 2002/0128826 A1* | 9/2002 | Kosaka et al. | 704/211 |
| 2003/0063073 A1* | 4/2003 | Geaghan et al. | 345/173 |
| 2003/0165246 A1* | 9/2003 | Kvaloy et al. | 381/312 |
| 2005/0110769 A1* | 5/2005 | DaCosta et al. | 345/173 |
| 2006/0033625 A1* | 2/2006 | Johnson et al. | 340/573.1 |
| 2006/0132455 A1* | 6/2006 | Rimas-Ribikauskas et al. | 345/173 |
| 2006/0212296 A1* | 9/2006 | Espy-Wilson et al. | 704/254 |
| 2007/0100608 A1* | 5/2007 | Gable et al. | 704/209 |
| 2008/0082018 A1* | 4/2008 | Sackner et al. | 600/538 |
| 2008/0158185 A1* | 7/2008 | Westerman | 345/173 |
| 2008/0211766 A1* | 9/2008 | Westerman et al. | 345/156 |
| 2009/0264789 A1* | 10/2009 | Molnar et al. | 600/544 |
| 2009/0287485 A1* | 11/2009 | Glebe | 704/233 |
| 2010/0225604 A1* | 9/2010 | Homma et al. | 345/173 |
| 2010/0318366 A1* | 12/2010 | Sullivan et al. | 704/275 |
| 2011/0010172 A1* | 1/2011 | Konchitsky | 704/233 |
| 2011/0050619 A1* | 3/2011 | Griffin | 345/174 |
| 2011/0092779 A1* | 4/2011 | Chang et al. | 600/301 |
| 2011/0109539 A1* | 5/2011 | Wu et al. | 345/156 |
| 2012/0019557 A1* | 1/2012 | Aronsson et al. | 345/633 |
| 2012/0056490 A1* | 3/2012 | Bruwer | 307/116 |
| 2012/0188200 A1* | 7/2012 | Roziere | 345/174 |
| 2012/0323087 A1* | 12/2012 | Leon Villeda et al. | 600/301 |
| 2013/0245486 A1* | 9/2013 | Simon et al. | 600/546 |
| 2014/0188467 A1* | 7/2014 | Jing et al. | 704/233 |

OTHER PUBLICATIONS

PCT, Notification Concerning Transmittal of International Preliminary Report on Patentability, In Application No. PCT/IL2012/000233, dated Jan. 3, 2014 (6 pages).

* cited by examiner

SYSTEM, DEVICE AND METHOD FOR DETECTING SPEECH

CLAIM OF PRIORITY

This application is national stage entry application, pursuant to 35 U.S.C. §371, of International Patent (PCT) Application No. PCT/IL2012/000233, which was filed Jun. 14, 2012; and which in turn claim priority from U.S. Provisional Patent Application Ser. No. 61/497,105 filed on 15 Jun. 2011.

FIELD OF THE INVENTION

The present invention relates to a novel use of touch screens associated with communication devices, such as cellular phones, and to communication devices designed for such use. The invention further relates to the operation of mobile communication devices by the detection of the occurrence of speech.

BACKGROUND OF THE INVENTION

Mobile communication devices have evolved substantially in the last decade and this evolution has led in many cases to the elimination of the distinction between portable computers, such as PDAs, and telephone devices, such as cellular or cordless telephones. Users are capable of communicating through VoIP or cellular-enabled PDAs pretty much like they do using cellular or cordless telephones. Products such as the IPHONE® available from APPLE Corporation of Cupertino, California and the GALAXY® available from SAMSUNG Corporation of Seoul, South Korea have completely blurred the line that distinguishes between different types of devices. For the sake of simplicity reference will be made in many cases in the description to follow to "phone", it being understood that the term encompasses all possible communication devices, including the ones referred to above.

The widespread use of phones has turned them into devices that are used in different environments, under very different conditions and when the user is engaged in a variety of activities. For instance, the same phone can be used at one time in a silent room, or in a noisy environment at a party, or outside under windy conditions. Moreover, phones are used when the user is engaged in other activities, with only one, or possibly no free hand to perform additional activities, such as pushing actual or virtual buttons on the phone.

One particularly challenging area relates to the recognition of the speech activities of the user, both for the purpose of improving the quality of communication, particularly in noisy environments, and for performing any other activity that is conditioned by the user's speech.

A need therefore exists for methods and apparatus that detect parameters related to a user's speech in a communication device, which parameters can be used to perform further processes inside the communication device.

It is an object of the present invention to provide a simple and relatively inexpensive way to exploit the touch screen provided in a communication device, to detect parameters associated with the speech of a user of the communication device.

It is another object of the invention to provide a communication device that is capable of detecting parameters associated with the speech of a user.

Other objects and advantages of the invention will become apparent as the description proceeds.

SUMMARY OF THE INVENTION

The mobile communication system of the invention comprises:
  a) a mobile communication device provided with a touch screen; and
  b) a speech activity analyzer suitable to receive from said touch screen data indicative of pressure applied to an area of said touch screen, and of changes thereto with time.

According to one embodiment of the invention the speech activity analyzer comprises:
  A) a cluster processor for identifying clusters;
  B) a feature extractor for extracting parameters from clusters identified by said cluster processor;
  C) a feature analyzer to analyze said parameters; and
  D) a speech activity decision maker element suitable to process said parameters to determine whether the user is speaking.

In one embodiment of the invention the speech activity analyzer is integral with the mobile communication device, while according to another embodiment of the invention the speech activity analyzer is located remotely from the mobile communication device and is in communication therewith. The communication between the speech activity analyzer and the mobile communication device can be performed in any suitable manner and typically, but not limitatively, is performed via Wi-Fi or Bluetooth, or by any wire or wireless means.

The mobile communication device according to the invention can be of different types, such as cellular phones, cordless phones, PDAs, etc..

The invention is also directed to a method for determining whether the user of a mobile communication device equipped with a touch screen is speaking into said mobile communication device, comprising:
  (i) obtaining from the touch screen signals representing clusters of grid points created from a contact between said touch screen and a user's cheek,
  (ii) analyzing the dynamics of pressure-related parameters of said clusters over time; and
  (iii) determining, from said analysis, if speech activity is present.

As will be further explained in the description to follow, clusters comprise pixels or groups of pixels differentiable by their coordinates on said touch screen. The parameters that can be derived from the contact between the users cheek and the touch screen can be of different kinds and, for instance, are selected from the center of gravity, perimeter, area and orientation, or a combination of two or more of said parameters.

The invention also encompasses devices and methods that exploit sensors provided in the mobile communication device to obtain an indication of whether the device has been brought into the vicinity of a user's ear.

BRIEF DESCRIPTION OF THE DRAWINGS

In the drawings:

FIG. 1 schematically illustrates a typical situation relevant to the present invention:

FIG. 5 illustrates the analysis of the data obtained from the touch screen:

DETAILED DESCRIPTION OF THE INVENTION

In the following detailed description numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

When a person speaks using a touch screen mobile phone, he typically holds the phone to his ear and usually, part of the phone panel touches against his cheek. Applicant has surprisingly found that it is possible to analyze signals generated by the pressure created by the users cheek on a touch screen of the phone, to extract parameters that can be used for functionally operating the phone. The pressure created on the touch screen by the cheek as a result of the speech activity changes, both in magnitude and in location, while the user speaks. The parameters derivable from such pressure can be used, in the simplest case, to determine whether a user is speaking, and in more complex cases they provide valuable information regarding the speech pattern, such as whether the user is speaking slowly or fast, loudness, etc.. Thus, in accordance with an embodiment of the invention, the touch screen may be utilized for speech activity detection (SAD).

Figure 1A:
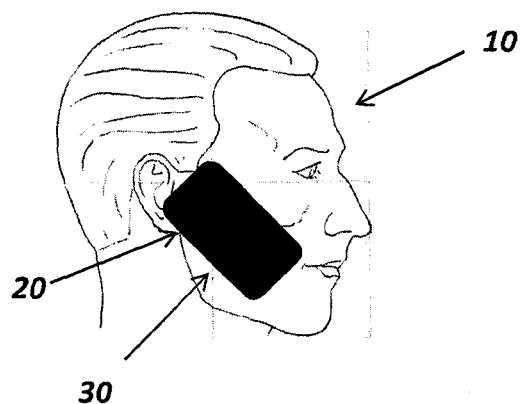
FIG. 1A illustrates a user with a mobile phone equipped with a touch screen, positioned against his cheek.
Figure 1B:
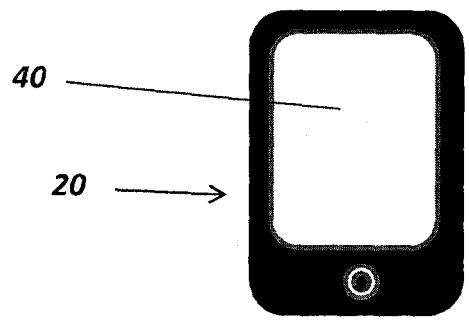
FIG. 1B, illustrates a front view of an exemplary mobile phone.

Reference is now made to FIG. 1A which illustrates a user 10 with a mobile phone 20 equipped with a touch screen, positioned against cheek 30. Reference is also made to FIG. 1B, which illustrates a front view of an exemplary mobile phone 20 showing the surface area occupied by touch screen 40. As will be apparent to the skilled person, while any commercial size of touch screen will generate signals when they are in contact with the cheek of a speaking person, it is desirable to employ larger size touch screens such as, for example, that of an iPhone 4, although the invention is not limited to any particular size and can be exploited as long as the size is sufficient to generate distinguishable signals.

It will be appreciated that when user 10 speaks, cheek 30 may be in contact with touch screen 40 and may exert pressure on it. In fact, that is the natural positioning for most users. The pressure and position of cheek 30 against touch screen 40 may change dynamically throughout the time that user 10 spends speaking on mobile phone 20, and different parts of cheek 30 may be in contact with different areas of screen 40 at any one time. There may also be periods during the conversation when user 10 does not speak and therefore, cheek 30 may be stationary against screen 40.

Figure 2:
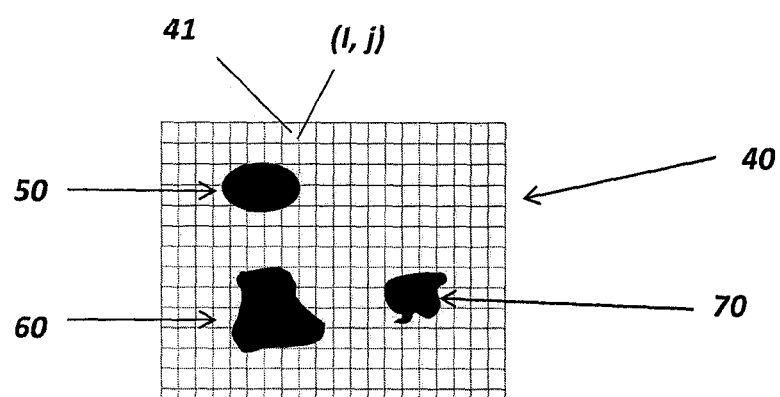
FIG. 2 schematically illustrates a 2-dimensional grid representation of a touch screen.

Reference is now made to FIG. 2 which illustrates a 2-dimensional grid representation of screen 40. A single grid element 41 (which can be a single pixel or, depending on the size of the pixel, a grid element consisting of a plurality of pixels) on screen 40 may be referred to by its "i" and "j" coordinates. Clusters 50, 60 and 70 schematically represent snapshots of areas of cheek 30 in contact with screen 40 at some time during a phone conversation. The term "cluster" is used herein to indicate a plurality of adjoining grid elements on which pressure is applied at the same point in time. Each individual cluster may contain more than one pixel, covering a different surface area of screen 40, and may detect a different pressure exerted against screen 40. It will be further appreciated that an analysis of the shape, dynamics and orientation of any cluster may provide different parameters which may be used for analysis, as described in more detail hereinbelow. The term "dynamics" as used hereinabove refers to the change in pressure that may occur in a specific cluster during a given time interval, which can also result in a change of shape of the cluster.

Figure 3:
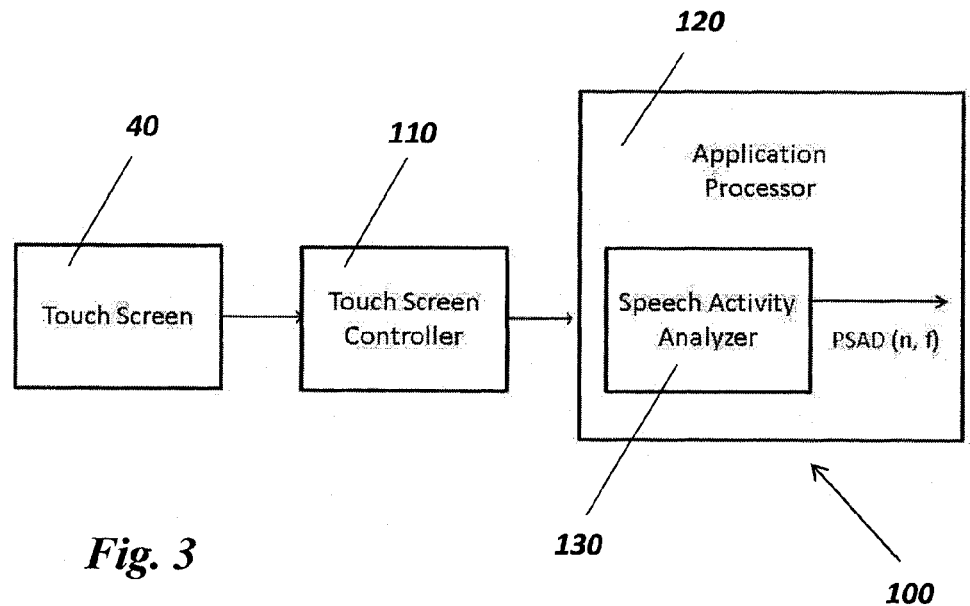
FIG. 3 illustrates the elements of an illustrative touch screen suitable for Speech Activity Detection (SAD), constructed and operative in accordance with an embodiment of the present invention.

Reference is now made to FIG. 3, which illustrates the elements of an illustrative touch screen SAD 100 constructed and operative in accordance with an embodiment of the present invention. System 100 comprises a touch screen 40, a touch screen controller 110 and an application processor 120. Application processor 120 comprises a speech activity analyzer 130. Touch screen 40 is controlled by controller 110 which in turn provides to processor 120 information regarding the pressure exerted by cheek 20 against screen 40. Processor 120 then interprets the pressure P at each grid element (i,j) on screen 40 at any time n. P(i,j,n), the pressure at point (i,j) at time n, is then provided to speech activity analyzer 130, via processor 120. The sampling rate of the pressure will of course vary, as will be apparent to the skilled person, according to the type of touch screen employed, the type of process that has to be initiated or controlled by speech-associated parameters, as well as by the level of precision required by the specific application. An indicative sampling rate is in the range 50-100 Hz per each grid element, but of course many different sampling rates can be used, depending on the intended use, and the skilled person will decide in each case which sampling rate he wishes to employ. The invention is not limited to any specific sampling rate.

It will be appreciated that for some applications it may be useful to know the speech activity per speech frequency f at time k. Therefore the output from voice activity analyzer 130 may be denoted PSAD (k,f). It will also be appreciated that PSAD (k,f) can be provided as a binary signal of 0 or 1 (Speech active=0, no speech=1) or any value between 0 to 1. This value indicates the probability that at frequency f at time k, speech activity will be detected.

Figure 4:
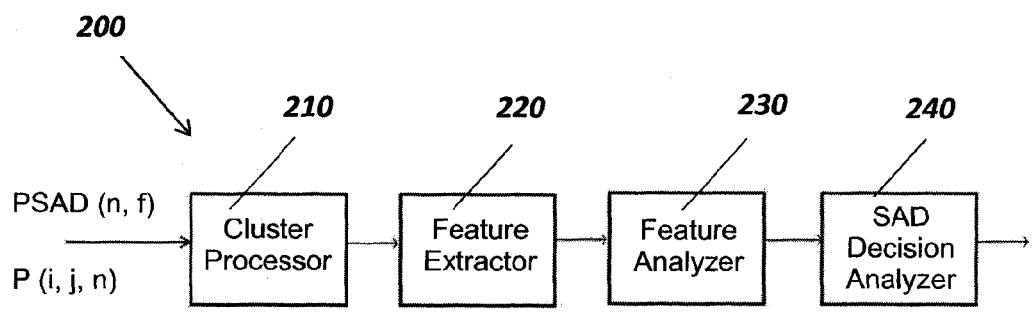
FIG. 4 schematically shows a SAD analysis system.

Different methods can be used for analyzing speech activity, and one such method and system will be illustrated with reference to FIG. 4, which schematically shows an SAD analysis system 200, for analyzing speech activity. SAD analysis system 200 may be part of speech activity analyzer 130, or may be provided separately, and in this illustrative example it comprise a cluster processor 210, a feature extractor 220, a feature analyzer 230 and a SAD decision maker 240.

According to this illustrative example, cluster processor 210 receives P(i,j,n) from touch screen controller 40 (FIG. 3) and identifies the presence of clusters, such as clusters 40, 50 and 60, if the user is speaking. Cluster processor 210 may implement any standard segmentation clustering algorithm used for two dimensional segmentation and clustering as an example refer to http://en.wikipedia.org/wiki/Segmentation_(image_processing).

It will be appreciated that the shape, orientation and other features may be analyzed for each cluster. Feature extractor 220 may extracts different parameters for each cluster and passes this information on to feature analyzer 230 which then analyzes the time behavior of each parameter. Illustrative parameters to be extracted by feature extractor 220 include, e.g., the center of gravity of the cluster (CoG), the length of its perimeter, its area and its orientation etc..

Figure 5A:
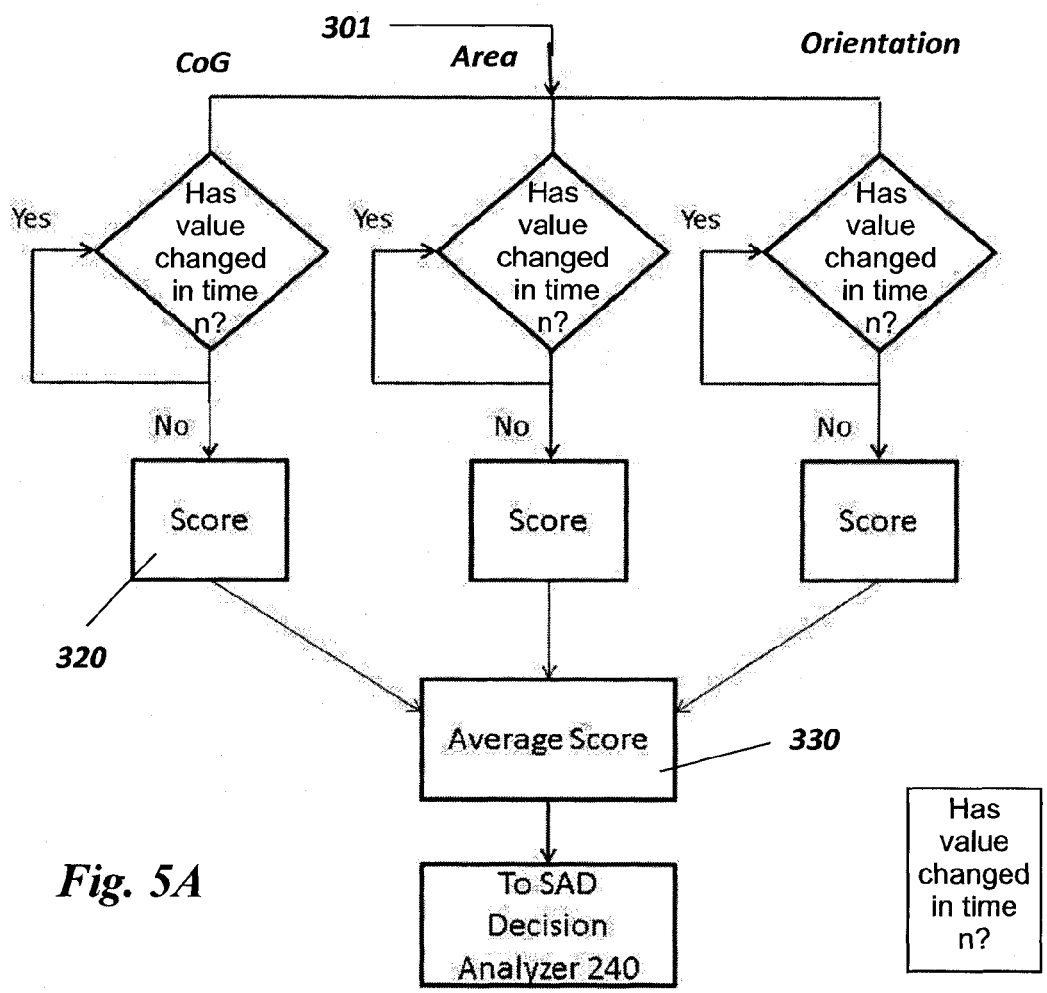
FIG. 5A is a flow chart of the time analysis process performed by a feature analyzer.
Figure 5B:
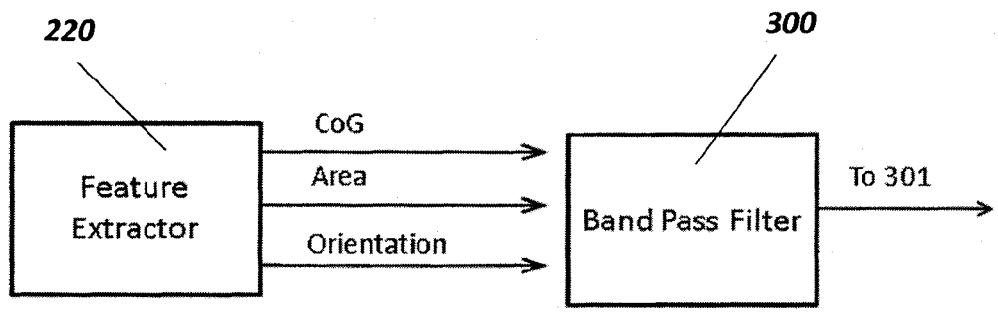
FIG. 5B illustrates the input of the parameters extracted by a feature extractor.

Reference is now made to FIG. 5A, which is a flow chart of the time analysis process performed by feature analyzer 230 (FIG. 4), of the parameters extracted by feature extractor 220 (see FIG. 5B), according to a specific example. The calculated value of the extracted parameter at time n is passed through a band-pass filter 300, to ensure that only parameters within a predefined range are accepted. This is to ensure that incorrect readings are not considered. For example, if user 10 chews gum during the period that he is not speaking, there still may be some movement detected against touch screen 40. However, the chewing is usually at a low frequency and thus, the frequency reading of $P(i,j,n)$ may fall below a predefined threshold and therefore may not be considered in the calculations. FIG. 5A shows the treatment done, according to this specific example, to the stream of data 301 leaving band-pass filter 300. The extracted parameters 301 are given a score according to their variation over a selected time period. For example, the center of gravity of a particular cluster may be monitored to see if it is constantly changing over time. This is because if user 10 is not talking while holding screen 40 against his cheek, although pressure may still be detected by screen 40, the center of gravity of a particular cluster may not change significantly. A score 320 be may be calculated for the center of gravity parameter and likewise for other parameters such as area and orientation. A final average score 330 across all parameters may then be calculated, which is fed into SAD analyzer 240. SAD analyzer 240 then makes a final decision as to whether there is Sound activity or not.

It will be appreciated that the touch screen SAD 100 of the present invention may be implemented in the application processor of mobile phone 20 or on any dedicated hardware or general purpose processor. For instance, data acquired through the pressure of the cheek on the touch screen can be relayed, e.g. via Wi-Fi or Bluetooth, to a distant processor that will perform the analysis and make the decisions, and which may feedback the results of this analysis to phone 20, via the same channel or a different one.

It will be appreciated that if user 10 speaks on mobile phone 20 in a noisy environment, the microphone of the mobile phone may pick up the voice signal combined with the surrounding ambient noise. If no noise cancellation technique is in place the person on the other end of the conversation will hear noise even when user 10 is not speaking.

There are many techniques known in the art for noise cancellation or noise suppression and many mobile phones and headsets use various techniques to reduce the effect of the background ambient noise. For the majority of these techniques to succeed, it is important to know whether a user is speaking or not. In the case that ambient noise is high, most SAD algorithms fail to provide a reliable decision in this respect.

However, it will be appreciated that touch screen SAD 100 is generally insensitive to ambient noise since it only detects the movement and pressure against the screen. It will further be appreciated that the use of touch screen SAD 100 as described hereinabove, in conjunction with any suitable noise cancellation technique that relies on information as to whether the user is speaking or not, may yield a high quality voice call even in a very noisy environment.

It will be further appreciated that mobile phones use voice compression algorithms to compress the speech that is sent via the mobile channel. One of the more popular algorithms in use today is adaptive multi-rate (AMR—see, e.g., http://en.wikipedia.org/wiki/Adaptive_Multi-Rate_audio_codec). This algorithm may also act as a silence detector which may detect whether a user is speaking or not by analyzing the speech signal. When the user is not talking fewer bits are sent, which is a very desirable feature for the mobile phone operators, as it increase the capacity of the mobile phone channel. However in a noisy environment, the algorithm cannot distinguish between a speech signal and a noise signal, the silence detector is ineffective and the number of transmitted bits will be high. It will be appreciated that touch screen SAD 100 may provide a reliable silence detector even in a noisy environment, which may significantly improve the efficiency of transmission via a mobile channel.

It will be further appreciated that the amount of radiation emitted during the use of a mobile phone may be of concern to some users. In an alternative embodiment of the current invention, touch screen SAD 100 may be used to determine when user 10 has mobile phone 20 touching his face by determining whether there is a $P(i,j,n)$ reading or not. If there is a reading, then according to this alternative embodiment speech activity analyzer 130 informs processor 120 (FIG. 3). Processor 120 then instructs the central processing unit (CPU) of mobile phone 20 to reduce transmission power. In the same manner, processor 120 may instruct the CPU to reduce CPU power in order to save on battery use, since less power may be required when mobile phone 20 is not transmitting. It will be appreciated that touch phone SAD 100 may be used as an indicator, as a silence detector and as a tool to reduce mobile phone emissions and save on power.

The invention may be exploited in some cases together with additional means. For instance, modern communication devices are equipped with sensors, such as accelerometers, which are suitable to determine when the device is brought to the user's ear, for instance in order to neutralize touch commands on the screen so that the user will not inadvertently activate them with his cheek. Combining such information with input from the touch screen—cheek interaction is also within the scope of the present invention.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

We claim:

1. A mobile communication system comprising: a mobile communication device provided with a touch screen; and a speech activity analyzer suitable to (a) receive from said touch screen data representative of clusters of grid points created from a contact between said touch screen and a user's cheek; (b) analyze dynamics of parameters of said clusters over time; and (c) determine, from said analysis, information regarding a speech of the user; wherein the information regarding the speech of the user is indicative of a speed of talking by the user.

2. A system according to claim 1, wherein said speech activity analyzer comprises: a cluster processor for identifying clusters; a feature extractor for extracting parameters from clusters identified by said cluster processor; a feature analyzer to analyze said parameters to provide a feature analysis result; and a speech activity decision maker element suitable to process said feature analysis result to determine whether the user is speaking.

3. A system according to claim 1, wherein the speech activity analyzer is integral with the mobile communication device.

4. A system according to claim 1, wherein the speech activity analyzer is located remotely from the mobile communication device and is in communication therewith.

5. A system according to claim 1, wherein the speech activity analyzer is suitable to receive from said touch screen data indicative of pressure applied by a cheek of the user to an area of said touch screen.

6. A system according to claim 3, wherein the mobile communication device is a cellular phone.

7. A system according to claim 3, wherein the mobile communication device is a cordless phone.

8. The system according to claim 1 wherein the feature extractor is for extracting parameters indicative of lengths of perimeters of the clusters identified by said cluster processor.

9. The system according to claim 1 wherein the feature extractor is for extracting parameters indicative of orientations of the clusters identified by said cluster processor.

10. A method for determining whether the user of a mobile communication device equipped with a touch screen is speaking into said mobile communication device, comprising: obtaining from the touch screen signals representing clusters of grid points created from a contact between said touch screen and a user's cheek; analyzing dynamics of parameters of said clusters over time; and determining, from said analysis, information regarding a speech of the user; wherein the information regarding the speech of the user is indicative of a speed of talking by the user.

11. A method according to claim 10, where said clusters comprise pixels or groups of pixels differentiable by their coordinates on said touch screen.

12. A method according to claim 10, wherein said parameters are selected from the center of gravity, perimeter, area and orientation, or a combination of two or more of said parameters.

13. A method according to claim 10, further comprising obtaining from sensors provided in the mobile communication device an indication of whether the device has been brought into the vicinity of a user's ear.

14. The method according to claim 10 wherein the parameters of said clusters are indicative of lengths of perimeters of the clusters.

15. The method according to claim 10 wherein the parameters of said clusters are indicative of orientations of the clusters.

16. The method according to claim 10 wherein the parameters of said clusters are pressure-related parameters of said clusters 17. The method according to claim 10 wherein the analyzing comprises (a) monitoring, for each cluster of the clusters identified by the cluster processor, for changes over time related to the cluster, wherein the changes over time related to the cluster include changes over time of an area of the cluster, changes over time of a center of gravity of the cluster and changes over time of an orientation of the cluster and (b) assigning, for the cluster, a score that is responsive to the changes over time related to the cluster 18. A mobile communication system comprising: a mobile communication device provided with a touch screen; and a speech activity analyzer suitable to (a) receive from said touch screen data representative of clusters of grid points created from a contact between said touch screen and a user's cheek; (b) analyze dynamics of parameters of said clusters over time; and (c) determine, from said analysis, information regarding a speech of the user;

wherein the feature analyzer is for monitoring, for each cluster of the clusters identified by the cluster processor, for changes over time related to the cluster, wherein the changes over time related to the cluster include changes over time of an area of the cluster, changes over time of a center of gravity of the cluster and changes over time of an orientation of the cluster and for assigning, for the cluster, a score that is responsive to the changes over time related to the cluster.

* * * * *